United States Patent [19]

Ingraham et al.

[11] Patent Number: 4,978,177

[45] Date of Patent: Dec. 18, 1990

[54] SIGNAL MECHANISM RESPONSIVE TO FORCE APPLIED TO VEHICULAR BRAKE PEDAL AND THE LIKE

[75] Inventors: Ronald D. Ingraham; Peter H. Strom, both of Reed City, Mich.

[73] Assignee: Nartron Corporation, Reed City, Mich.

[21] Appl. No.: 376,642

[22] Filed: Jul. 6, 1989

[51] Int. Cl.⁵ .............................................. B60T 13/70
[52] U.S. Cl. .......................................... 303/3; 74/514; 188/158; 303/50; 303/15; 340/479; 200/61.89
[58] Field of Search ............................ 303/3, 50-56, 303/20, 15, 101; 188/158, 159, 1.11; 338/108, 47; 340/479; 60/545; 91/361; 200/61.89, 86.5, 553; 74/514, 512; 73/862.65, 862.64

[56] References Cited

U.S. PATENT DOCUMENTS

| | | | |
|---|---|---|---|
| 2,091,086 | 7/1937 | Taylor | 177/337 |
| 2,232,447 | 2/1941 | Griffith | 200/59 |
| 2,276,028 | 3/1942 | Dick | 200/59 |
| 2,445,660 | 7/1948 | Bruestle | 201/50 |
| 2,454,291 | 11/1948 | Penrose | 201/51 |
| 2,530,131 | 11/1950 | Roters | 318/261 |
| 2,674,669 | 4/1954 | Leedam | 200/86.5 |
| 2,832,863 | 4/1958 | Quimby | 200/61.89 |
| 3,125,739 | 3/1964 | Deibel et al. | 338/99 |
| 3,171,917 | 3/1965 | Leichsenring | 200/86.5 |
| 3,219,775 | 11/1965 | Carpenter | 200/61.89 |
| 3,390,243 | 6/1968 | Obermann | 200/166 |
| 3,398,992 | 8/1968 | Littmann | 303/20 |
| 3,419,115 | 12/1968 | Glenn | 192/2 |
| 3,439,323 | 4/1969 | Kersting | 340/52 |
| 3,574,414 | 4/1971 | Jacob | 303/7 |
| 3,581,028 | 5/1971 | Valbona | 200/38 |
| 3,622,723 | 11/1971 | Fischel | 200/86 R |
| 3,711,162 | 1/1973 | Steinbrenner et al. | 303/21 R |
| 3,766,342 | 10/1973 | Stadelmann | 200/61.89 |
| 3,802,745 | 4/1974 | Strifler et al. | 303/3 |
| 3,814,484 | 6/1974 | Matthews et al. | 303/20 |
| 3,823,985 | 7/1974 | Hubbard | 303/7 |
| 3,827,758 | 8/1974 | Hansen | 303/3 |
| 3,838,888 | 10/1974 | Gynn | 303/20 |
| 3,840,276 | 10/1974 | Jubenville | 303/20 |
| 3,882,442 | 5/1975 | Hubbard | 338/42 |
| 3,911,394 | 10/1975 | Shames | 340/71 |
| 3,981,542 | 9/1976 | Abrams et al. | 303/20 |
| 4,005,759 | 2/1977 | Farr | 180/65 R |
| 4,145,317 | 3/1979 | Sado et al. | 252/512 |
| 4,152,304 | 5/1979 | Tadewald et al. | 252/506 |
| 4,163,204 | 7/1979 | Sado et al. | 338/114 |
| 4,297,550 | 10/1981 | Leighton | 200/61.89 |
| 4,404,439 | 9/1983 | Leighton | 200/61.89 |
| 4,419,653 | 12/1983 | Walgand | 338/114 |
| 4,441,097 | 4/1984 | Anderson | 340/365 A |
| 4,602,702 | 7/1986 | Ohta et al. | 188/72.1 |
| 4,639,710 | 1/1987 | McMillan et al. | 338/108 |
| 4,658,939 | 4/1987 | Kircher et al. | 188/156 |
| 4,784,442 | 11/1988 | Petersen | 303/52 X |
| 4,818,036 | 4/1989 | Reinecke | 74/512 X |

Primary Examiner—Douglas C. Butler
Attorney, Agent, or Firm—Lon H. Romanski

[57] ABSTRACT

A vehicular brake lever arrangement is shown as having a brake lever pivotally supported at one end and a swingable other end provided with a pad for the application of a braking force thereto; a brake rod linkage leading to the vehicular braking system is pivotally connected to the brake lever as to have a slight translational movement relative to the brake lever; and a force sensitive resistor is placed as to experience a force thereagainst as such translational movement occurs between the brake lever and brake rod linkage.

34 Claims, 11 Drawing Sheets

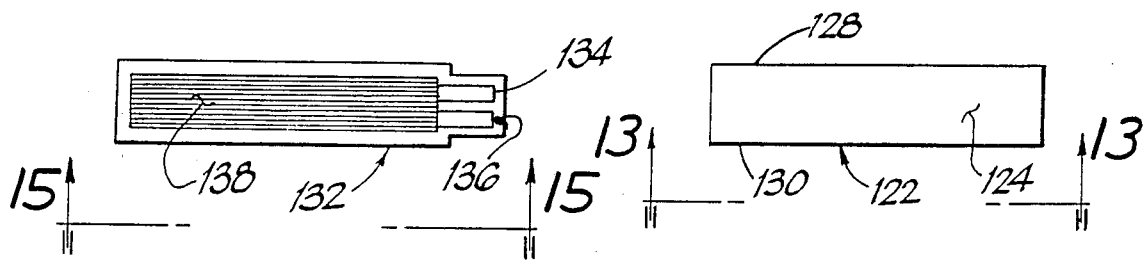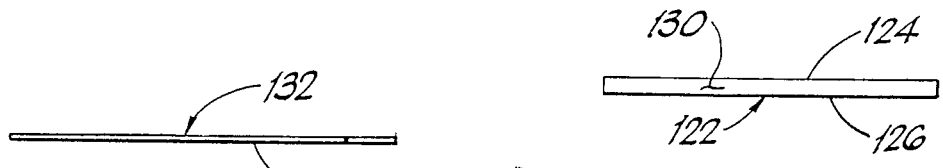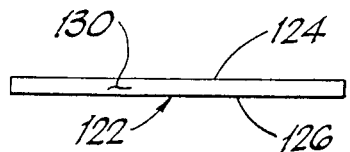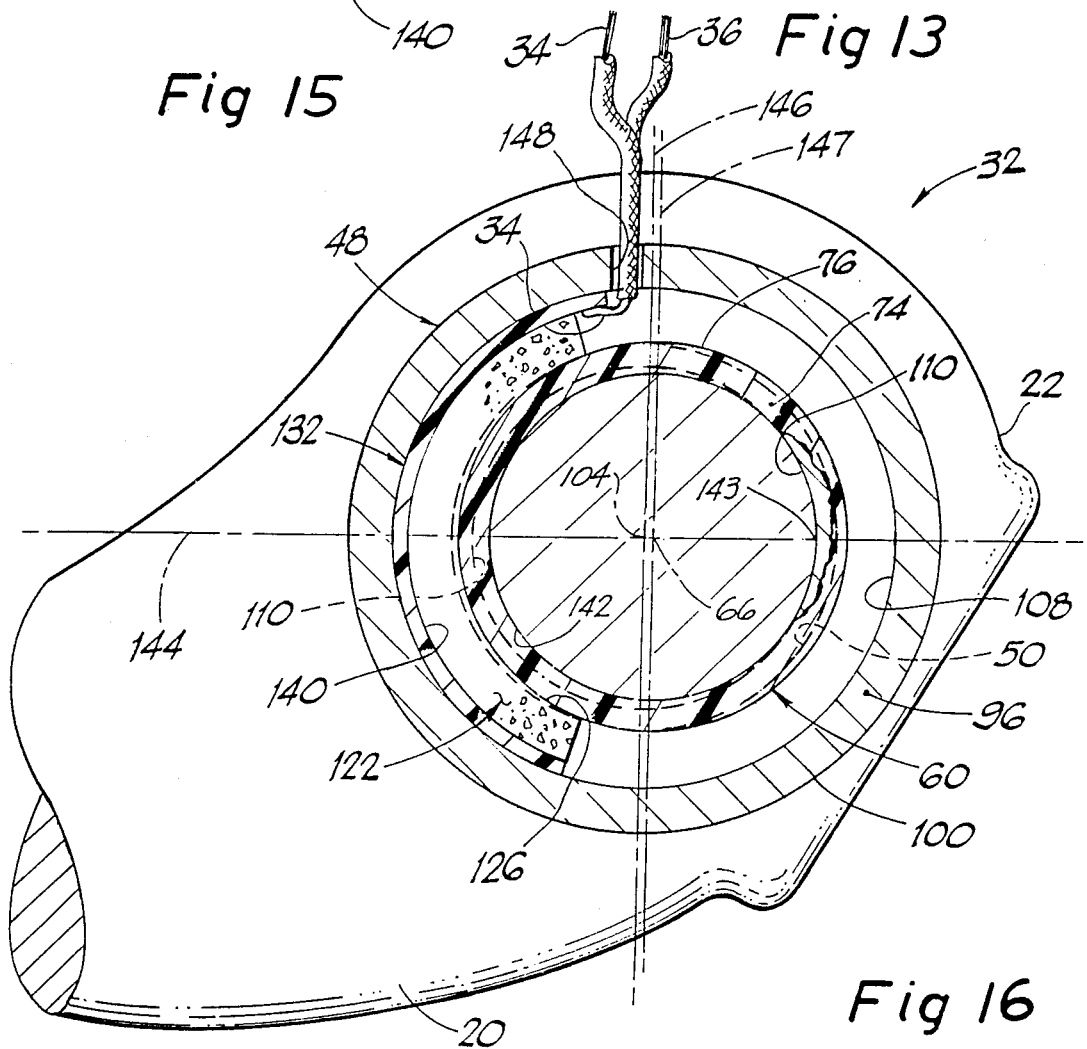

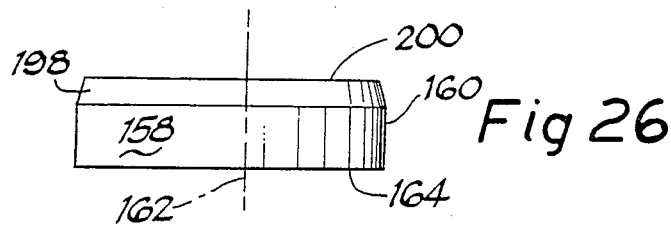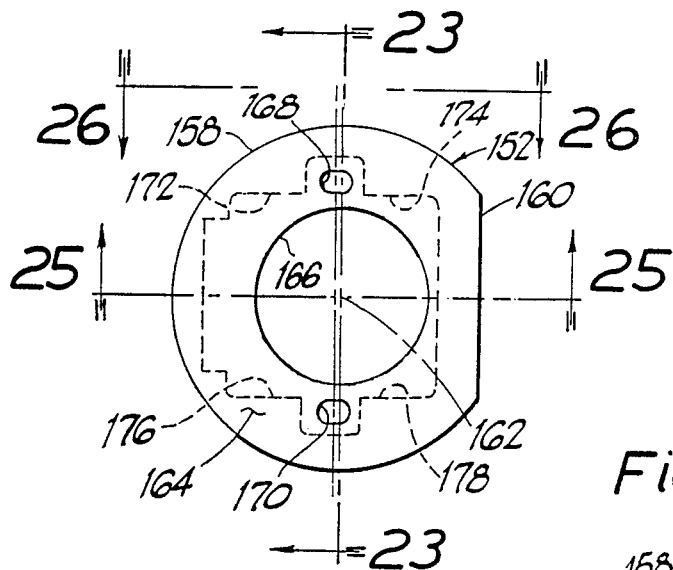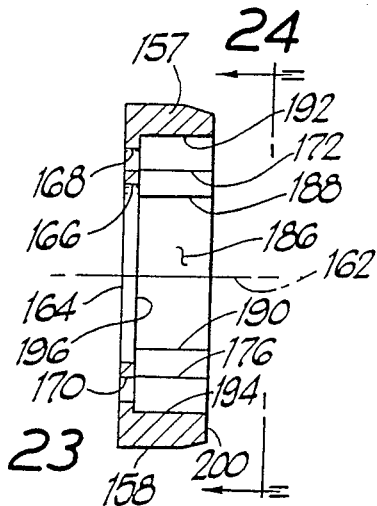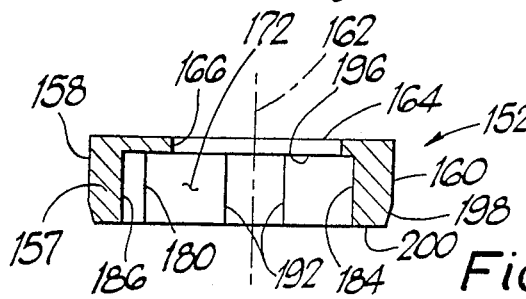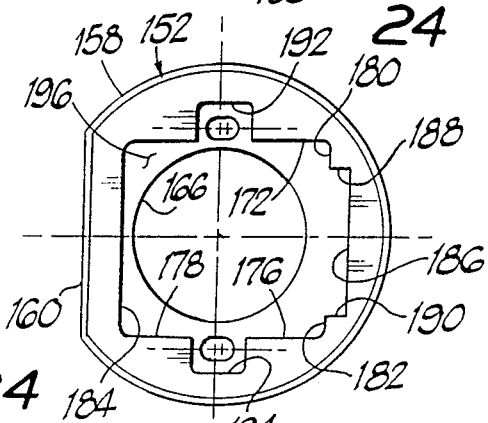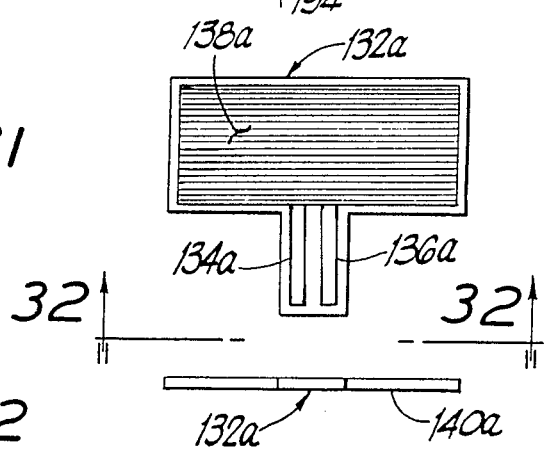

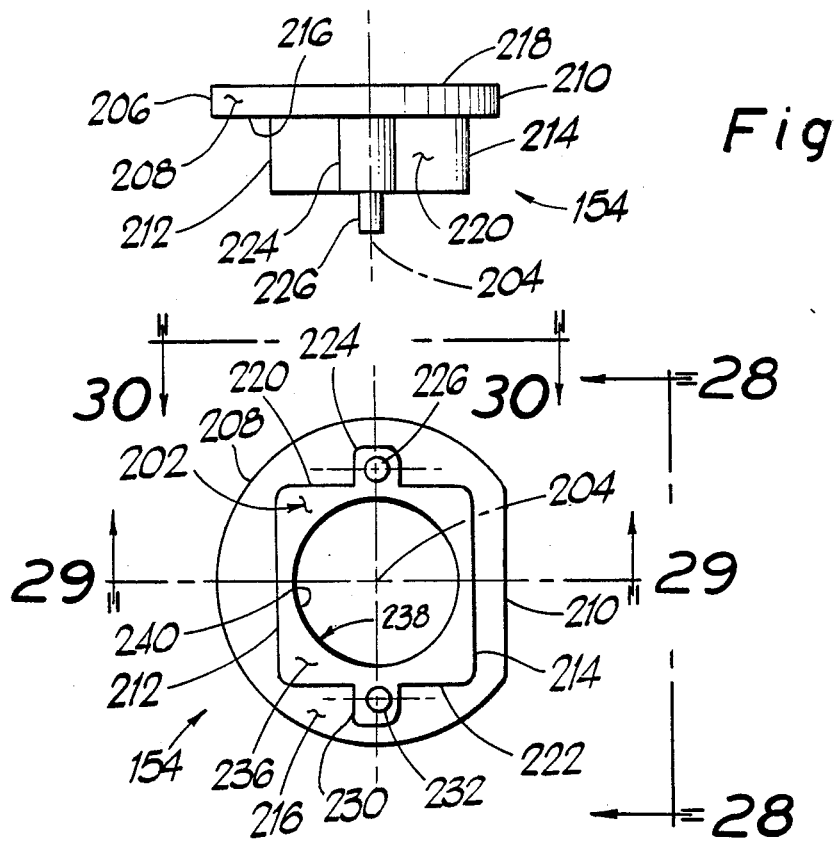
Fig 30
Fig 27
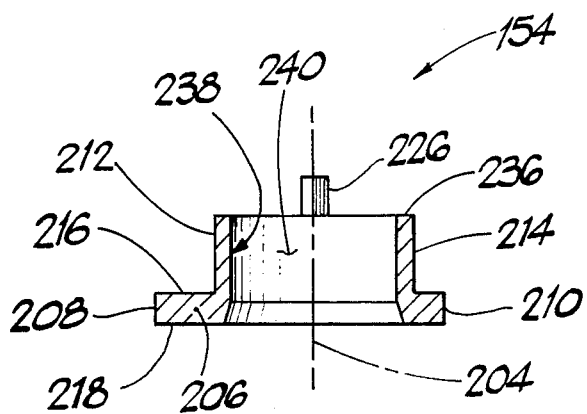
Fig 29
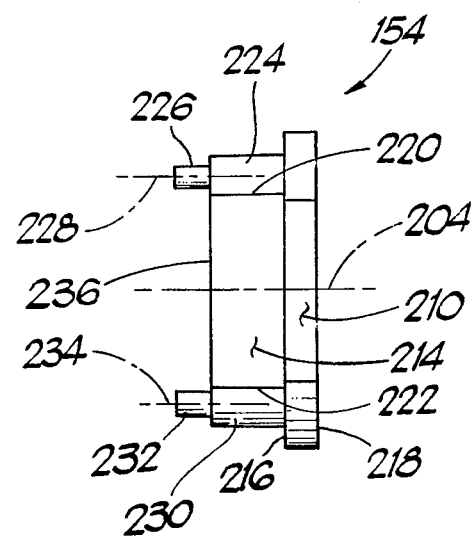
Fig 28

SIGNAL MECHANISM RESPONSIVE TO FORCE APPLIED TO VEHICULAR BRAKE PEDAL AND THE LIKE

FIELD OF THE INVENTION

This invention relates generally to electricalswitching means and more particularly to switching means responsive to an applied force for in turn providing an output employable to initiate or terminate a related event.

BACKGROUND OF THE INVENTION

Heretofore motor vehicle braking systems typically employed mechanical switches which were fastened to the structure of the vehicle as to be in operative contact with the brake pedal for indicating the depression of the brake pedal. Whenever the brake pedal was depressed, the switch closed thereby causing the vehicular stop lights to be energized.

Other prior art systems employed fluid pressure switches which, generally, were connected to the vehicular brake system hydraulic actuating circuitry and were responsive to and actuated by pressure changes in the hydraulic fluid. Such fluid pressure switches, when actuated by a sufficient hydraulic pressure, also served to cause the vehicular stop lights to be energized. Occasionally, fluid leakage would occur, in the area where such pressure switch was mounted, resulting in loss of hydraulic brake actuating fluid and consequent failure of the vehicular braking system.

Still other prior art systems employed in-line mechanical switches comprising an operative connection in the mechanical linkage of the vehicular brake system. Generally, such switches were mounted for movement with the linkage and as such increased the magnitude of the required actuating pressure or force to be applied by the vehicular operator.

Such prior art systems either require a form of adjustment, both when initially assembling the switch into the system and during the life of the system because of linkage wear, or in effect provide an additional weak link in the vehicular braking system. This, of course, involves both labor and additional supporting structure which, when multiplied by the number of motor vehicles built in a given period of time, results in extra costs and expenses.

Further, in such prior art systems, the slight force or pressure applied to a vehicular brake pedal by the vehicular driver, as through the inadvertent resting of the driver's foot on the brake pedal, usually causes the associated switch to be actuated even though the brake system is not being energized. Obviously, having the vehicular stop lights thusly become energized, when the vehicle in fact is not undergoing braking, gives a false warning to the following vehicles thereby destroying the safety value of the stop lights. Also, such prior art switches are generally slow acting and switch failure due to electrical contact erosion is not uncommon.

The invention as herein disclosed and described is primarily directed to the solution of the aforestated as well as other related and attendant problems of the prior art.

SUMMARY OF THE INVENTION

According to the invention wherein a first movable element is employed for moving a second movable element, a signal generating means for indicating when a preselected magnitude of force is applied to said first movable element in the act of at least tending to move said second movable element comprises force sensitive electrical resistance means, wherein said force sensitive electrical resistance means varies its electrical resistance in response to the magnitude of force applied thereto, and wherein said electrical resistance means is situated as to experience thereagainst a reaction-force developed in response to said force applied to said first movable element, said force sensitive electrical resistance means being effective upon said reaction-force attaining a preselected magnitude to produce a magnitude of electrical resistance which signals the attainment of said preselected magnitude of force applied to said first movable element.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 12 is a top plan view of still another element shown in FIG. 3, as well as in FIG. 16;

FIG. 13 is a view taken generally on the plane of line 13—13 of FIG. 12 and looking in the direction of the arrows;

FIG. 14 is a top plan view of another element shown in FIG. 3, as well as in FIG. 16;

FIG. 15 is a view taken generally on the plane of line 15—15 of FIG. 14 and looking in the direction of the arrows;

FIG. 16 is a cross-sectional view taken generally on the plane of line 16—16 of FIG. 3 and looking in the directions of the arrows;

FIG. 22 is a view, in relatively reduced scale, of one of the elements shown in FIGS. 19, 20 and 21;

FIG. 23 is a cross-sectional view taken generally on the plane of line 23—23 of FIG. 22 and looking in the direction of the arrows;

FIG. 24 is a view taken generally on the plane of line 24—24 of FIG. 23 and looking in the direction of the arrows;

FIG. 25 is a cross-sectional view taken generally on the plane of line 25—25 of FIG. 22 and looking in the direction of the arrows;

FIG. 26 is a view taken generally on the plane of line 26—26 of FIG. 22 and looking in the direction of the arrows;

FIG. 27 is a view, in relatively reduced scale, of another element shown in FIGS. 19, 20 and 21;

FIG. 28 is a view taken generally on the plane of line 28—28 of FIG. 27 and looking in the direction of the arrows;

FIG. 29 is a cross-sectional view taken generally on the plane of line 29—29 of FIG. 27 and looking in the direction of the arrows;

FIG. 30 is a view taken generally on the plane of line 30—30 of FIG. 27 and looking in the direction of the arrows;

FIG. 31 is a view similar to that of FIG. 14 but illustrating a functionally equivalent element of the embodiment of FIGS. 19-21; and FIG. 32 is a view taken generally on the plane of line 32—32 of FIG. 31 and looking in the direction of the arrows.

DETAILED DESCRIPTION OF THE PREFERRED EMBODIMENTS

Figure 1:
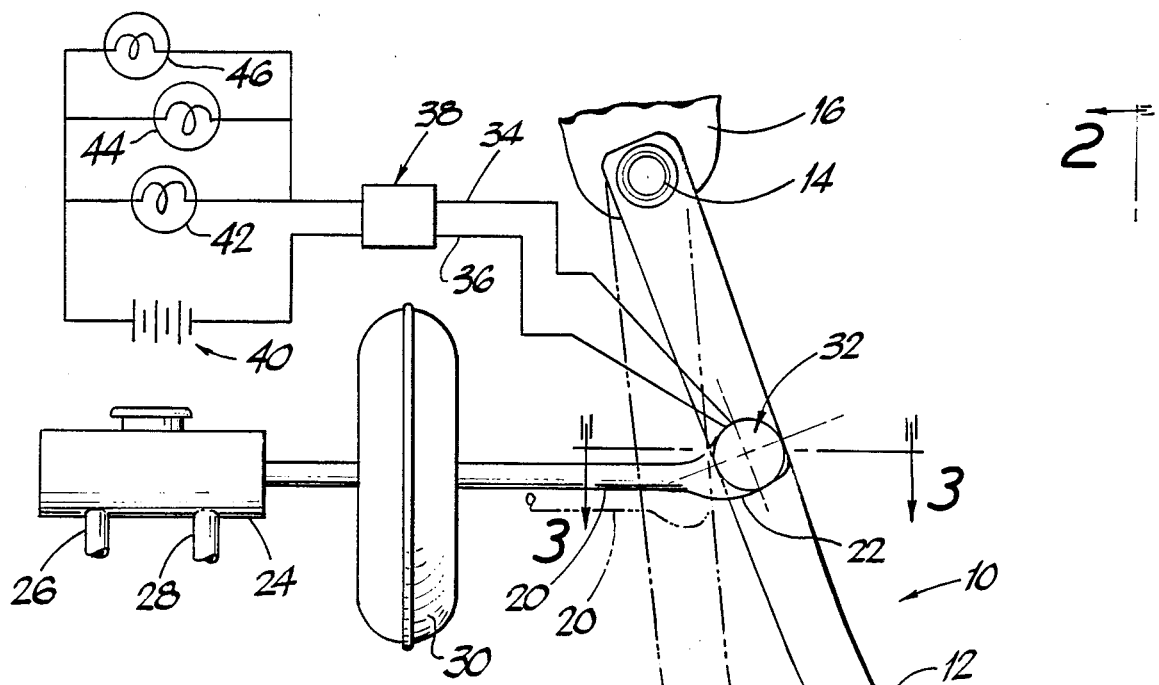
FIG. 1 is a side elevational view of an automotive brake pedal assembly, employing teachings of the invention, shown in combination with environmental structure and electrical circuitry some of which is generally diagrammatically illustrated while other portions are schematically illustrated.
Figure 2:
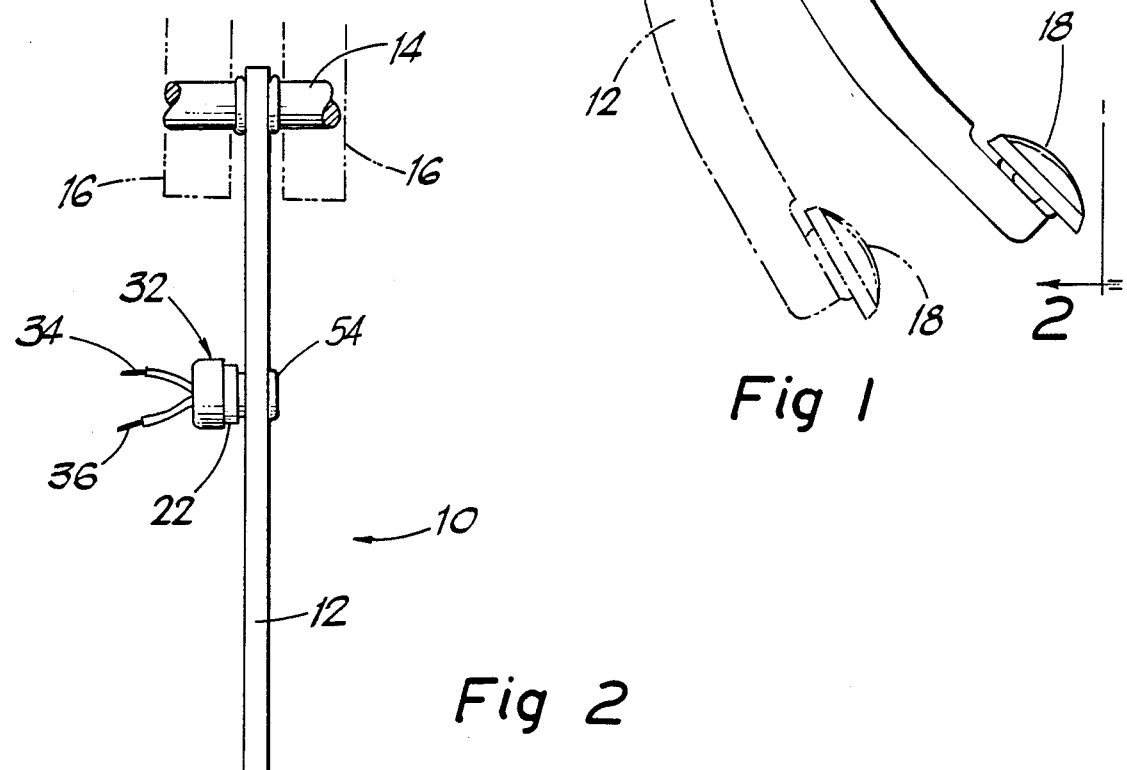
FIG. 2 is a view taken generally on the plane of line 2—2 of FIG. 1 and looking in the direction of the arrows.

Referring now in greater detail to the drawings, FIGS. 1 and 2 illustrate a portion of an overall braking system of an associated automotive vehicle. A brake pedal means 10 is depicted as comprising a lever body 12 pivotally connected, at its upper end, as by pivot means 14 operatively connected to Journal or pivot support means 16 which, in turn, may comprise a portion of the vehicular structure. The lower end of lever body 12 carries a brake pedal 18 suitably secured thereto.

A brake actuating rod or push rod 20 has its right end 22 (as viewed in FIG. 1) pivotally connected to brake lever 12. When the brake pedal assembly 10 is actuated by the vehicular driver, from its null or inactive state as depicted in solid line in FIG. 1 to its assumed maximum braking force as depicted in phantom line in FIG. 1, the push rod or brake rod 20 moves toward the left (as viewed in FIG. 1) as to cause a hydraulic displacement in an associated vehicular brake system master cylinder assembly 24 thereby applying a hydraulic pressure, as via conduit means 26 and 28 to the respective wheel brake assemblies (not shown but well known in the art) of the associated vehicle. Such application of a braking force may be done directly by the brake rod or arm 20 or through associated power assist means depicted at 30.

The operative connection as between the brake rod 20 and brake lever 12 comprises a signal mechanism 32 which is effective for creating an electrical signal when a preselected force is applied to the brake pedal 18. When such an electrical signal is applied via conductor means 34 and 36 to related electrical switch means 38, solid state or otherwise, the vehicular source of emf 40 energizes the vehicular stop lights 42, 44 and 46 where lights or lamps 42 and 44 may be the left and right stop lamps while light or lamp 46 may be a generally medially situated relatively elevated stop light.

Figure 3:
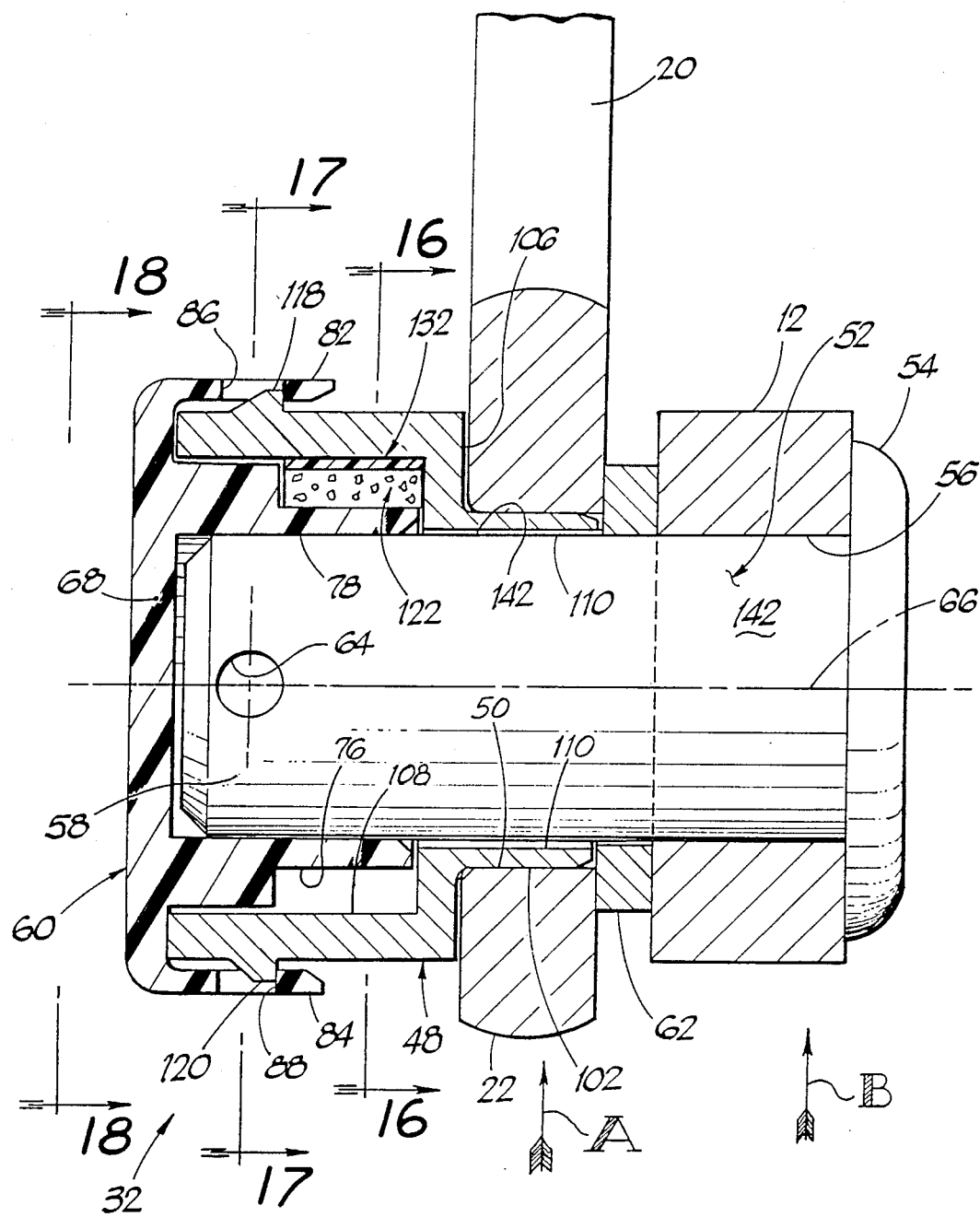
FIG. 3 is a cross-sectional view, in relatively enlarged scale, taken generally on the plane of line 3—3 of FIG. 1 and looking in the direction of the arrows.

Referring to FIG. 3, the signal mechanism or sensor assembly 32 is illustrated as comprising a first generally tubular member 48, of stepped cylindrical diameter received within and by a cooperating passage or aperture 50 formed through the push rod or brake rod 20. A cylindrical pin or cross-member 52, having a head 54, received by a passage or aperture 56 in brake lever 12, extends through at least a portion of member 48 as to have its left-most end 58 (as viewed in FIG. 3) received by a counterbore of a generally outermost member 60. In the embodiment depicted, a passage 64 is formed through pin or cross-member 52 preferably as to have its longitudinal axis normal to the center-line or longitudinal axis 66 of pin 52. If desired, an annular spacer 62 may be provided as between brake lever 12 and brake rod 20.

Referring to FIGS. 4, 5, 6 and 7, the outermost member 60, which may be considered, for example, as a cover, bearing and/or carrier, is illustrated as comprising a circular or disk-like axial end wall 68 which is integrally formed with a first generally axially aligned tubular wall portion 70, having an outer cylindrical surface 72, and a second axially aligned tubular wall portion 74 having an outer cylindrical surface 76 of an outer diameter significantly less than that of surface 72. The wall portions 70 and 74 define an inner cylindrical surface 78 which is open at the right (as viewed in FIG. 6) or outermost end thereof as at 80.

Figure 5:
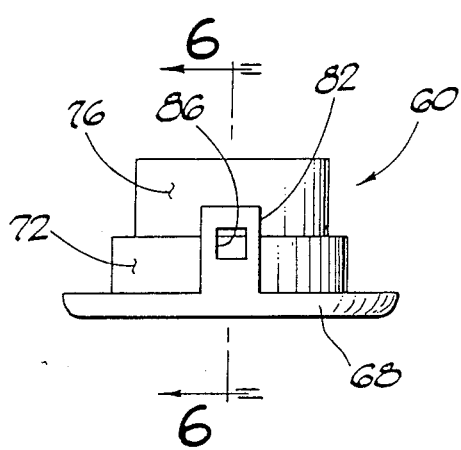
FIG. 5 is a view taken generally on the plane of line 5—5 of FIG. 4 and looking in the direction of the arrows.
Figure 6:
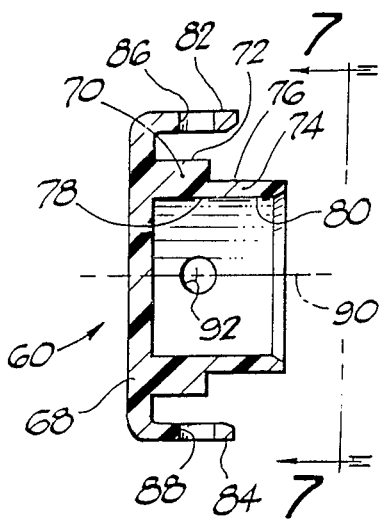
FIG. 6 is a cross-sectional view taken generally on the plane of line 6—6 of FIG. 5 and looking in the direction of the arrows.
Figure 4:
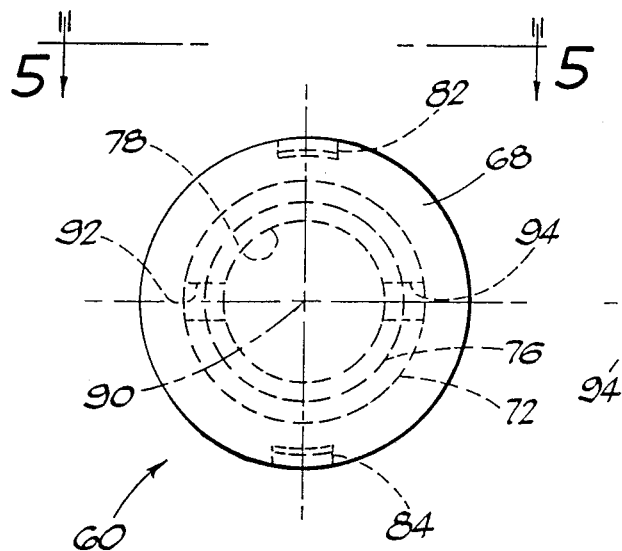
FIG. 4 is an axial end elevational view, in relatively reduced scale, of one of the elements shown in FIG. 3.
Figure 7:
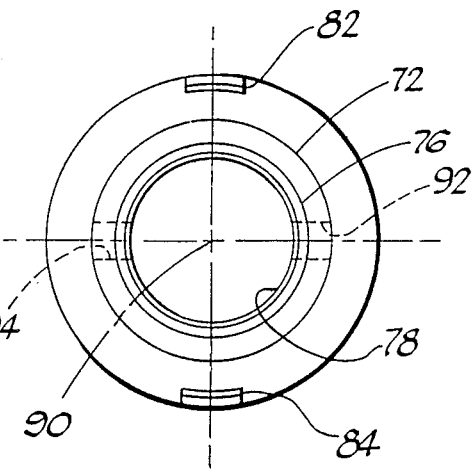
FIG. 7 is a view taken generally on the plane of line 7—7 of FIG. 6 and looking in the direction of the arrows.
Figure 11:
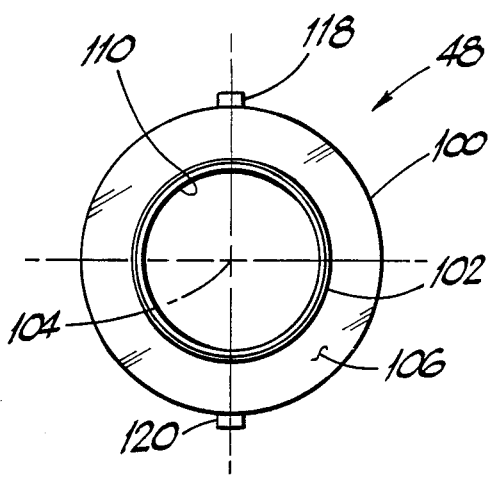
FIG. 11 is a view taken generally on the plane of line 11—11 of FIG. 8 and looking in the direction of the arrows.

In the preferred embodiment, the disk-like end portion 68 of carrier 60 is provided with integrally formed diametrically situated arms 82 and 84 which, in turn, have generally squared holes or passages 86 and 88 formed therethrough. As best seen in FIGS. 5 and 6, the arms 82 and 84 extend from end wall 68 generally parallel to the axis 90 of member 60. Also, as shown in each of FIGS. 4, 6 and 7, aligned passageways 92 and 94, preferably on diameter, are formed through the walls of the tubular portion of member 60. In the preferred embodiment, the end cover or carrier 60 is formed of suitable plastic material as, for example, a 30% glass reinforced polyester. Such could be, for example, "Rynite" which is a United States of America registered trademark, of DuPont de Nemours, E.I. & Co. of Wilmington, Del., for a glass-reinforced polyester; a modified polyethylene terephthalate featuring high-temperature resistance, high tensile and impact strength and good electrical resistance.

FIGS. 8, 9, 10 and 11 illustrate the housing 48 (of FIG. 3) as comprising a first relatively large generally tubular cylindrical body portion 96 which is integrally formed with a second relatively small generally tubular cylindrical body portion 98. Body portions 96 and 98 are respectively provided with outer cylindrical surface 100 and 102 which are substantially concentric to each other and having an axis 104. A generally radially directed annular shoulder surface 106 effectively interconnects outer cylindrical surfaces 100 and 102.

Figure 10:
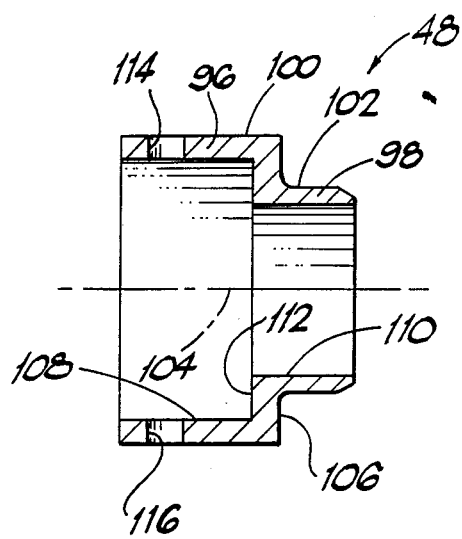
FIG. 10 is an axial cross-sectional view taken generally on the plane of line 10—10 of FIG. 8 and looking in the direction of the arrows.
Figure 9:
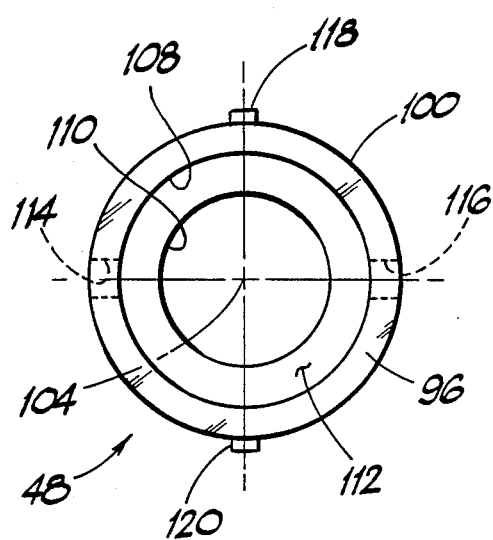
FIG. 9 is a view taken generally on the plane of line 9—9 of FIG. 8 and looking in the direction of the arrows.
Figure 8:
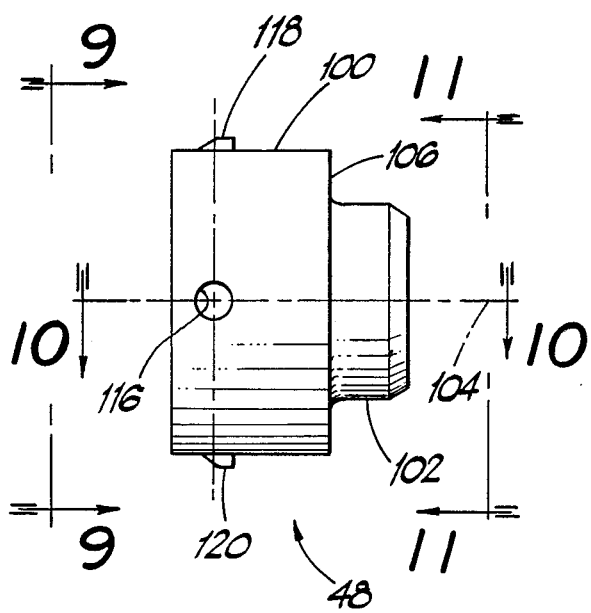
FIG. 8 is a side elevational view, in relatively reduced scale, of another element shown in FIG. 3.

Somewhat similarly, body portions 96 and 98 are respectively provided with inner cylindrical surfaces 108 and 110 which are substantially concentric to each other and also have the same axis 104. The cylindrical surface 110 is a through passage while cylindrical surface 108 ends as at an internal radially directed annular surface 112. As shown in each of FIGS. 8, 9 and 10, aligned passageways 114 and 116, preferably on diameter, are formed through the walls of the cylindrical body portion 96. As seen in FIGS. 8, 9 and 10, a plurality of diametrically opposed ear-like locking or detent portions 118 and 120 are preferably integrally formed with cylindrical body portion 96 as to extend radially outwardly of outer cylindrical surface 100.

In the preferred embodiment the housing or force transfer member 48 is formed of a suitable plastic material which, for example, may be the same material comprising member 60 as already herein described.

FIGS. 12 and 13 illustrate another element shown in FIG. 3 (as well as in FIG. 16). More specifically a backing member or force distribution member 122 is depicted in FIGS. 12 and 13 as being of a generally parallelepiped configuration having relatively wide opposite surfaces 124 and 126 and relatively narrow opposite side or edge surfaces 128 and 130. In the preferred embodiment, member 122 is comprised of rubber or any other suitable elastomeric material.

FIGS. 14 and 15 illustrate a force sensor cell 132 which, in the embodiment disclosed comprises a force sensing resistor. Generally, such a force sensing resistor 132 may comprise two sheets of polymer film with one of such sheets having a set of interdigitating fingers terminating in two electrical terminals or leads 134 and 136. On the other sheet, an electrically resistive film is applied to one side thereof. The two sheets are then brought together as to have the resistive film lie across and against the conductive finger network of the first mentiond sheet thereby forming what may be considered a sandwich-like construction. Applying a force to the resulting sandwich construction causes the electrical resistance as between the contacts or terminals 134 and 136 to decrease. In FIG. 14, the darkened area 138 is intended to generally designate the area wherein the conductive finger network and cooperating resistive film may be located. In the preferred embodiment, the lower surface 140 of the lower (as in FIG. 15) sheet would be provided with a suitable adhesive. Such a force sensing resistor may be obtained, as for example, from Interlink Electronics, Inc. having an address of 535 E. Montecito Street, Santa Barbara, Calif.

Referring to both FIGS. 3 and 16, the housing or brake force transmitting member 48 is shown having its smaller tubular body portion 98 received within the aperture or passage 50, formed through the brake rod 20, in a manner whereby the outer cylindrical surface 102 is preferably press-fitted into and against the cooperating cylindrical surface of aperture 50. At this time the radially extending annular surface 106 may be juxtaposed to or in contact with the brake actuating rod 20. The brake lever or arm pin 52 is closely received through the cooperating aperture 56 in brake lever 12 in a manner whereby the head 54, thereof, effectively abuts against brake lever 12 while the cylindrical shank portion 142 thereof slides through an annular spacer 62, if such be desired, and loosely slides through the cylindrical passage 110 of member 48. At this point, as possibly best seen in FIG. 3, it should be mentioned that at least in the area where the outer cylindrical surface of cylindrical shank portion 142 is in juxtaposition to passage 110 of member 48, the inner diameter of cylindrical passage 110 is a selected amount larger than the outer diameter of cylindrical shank portion 142. By way of example, and not limitation the difference between the outer diameter of shank portion 142 and the inner diameter of passage 110 may be in the order of 0.016 inch (0.41 mm.). For purposes of clarity and ease of description, FIGS. 3 and 16 may be considered as representing two different states or conditions of the braking system. That is, in FIG. 3, wherein arrow A indicates the direction of travel by the brake rod means 20, during energization of the vehicular brakes, and wherein arrow B indicates the general direction of travel by the brake lever 12 during energization of the vehicular brakes, the assembly of FIG. 3 depicts what may be considered some intermediate condition of vehicular brake application by the vehicular driver during which the outer cylindrical surface of shank 142 is not in contact with inner cylindrical surface 110 as appears either above or below the axis 66. FIG. 16, in comparison, illustrates the same elements, as shown in FIG. 3, in what may be considered as a null or inactivated state of vehicular brake energization with, at that time, the outer cylindrical surface of shank 142 resting against the inner cylindrical surface 110, as at a point 143 situated as on the horizontally depicted axis 144, as at where it is crossed by the vertical axis 147, thereby describing a crescent-like space between the shank 142 and surface 110 as depicted generally left of the vertical axis 146 in FIG. 16. In the condition depicted in FIG. 16, the axis 66 of shank 142 would be displaced generally to the right of axis 104 of member 48 (as viewed in FIG. 16).

In the preferred arrangement, force sensitive resistor means or cell 132 is suitably secured as by, for example, an adhesive to the inner cylindrical surface 108 of housing or brake force transmitting member 48 as to be located and positioned as generally depicted in FIGS. 3 and 16. The elastomeric or backing member 122 may then be applied, adhesively, onto the force sensitive resistor means or cell 132 as to be located and positioned as also generally depicted in FIGS. 3 and 16. A suitable clearance aperture or passage 148 may be formed through the wall 96 of member 48 and the conductors 34 and 36 (also see FIG. 1) drawn therethrough as to have the ends thereof respectively electrically connected to contacts or terminals 134 and 136 of force responsive cell 132.

Cover or bearing member 60, being aligned or positioned as best shown in FIG. 3, slides axially into inner cylindrical surface 108 of member 48. The arms 82 and 84 of member 60 first override the cooperating tab-like portions 118 and 120 and finally abutably engage such portions 118 and 120 by respective reception thereof in arm apertures 86 and 88. Thus assembled, with elastomeric member 122 abutting outer cylindrical surface 76 of member 60, and cell member 132 abutting inner cylindrical surface 108 of member 48, and conductors 34 and 36 electrically connected to contacts 134 and 136, the entire assembly unit is slid onto the pin shank 142, with inner cylindrical surface 110 of member 48 being of a clearance condition over pin shank 142. The engagement as between inner cylindrical surface 78 of member 60 and the outer cylindrical surface of shank portion 142 is preferably a light press-fit. As the thusly pre-assembled unit continues to be moved axially onto shank 142, outer cylindrical surface 102 of member 48 engages with aperture or passage 50 through push rod or member 20 with the engagement of cylindrical surface 102 and passage 50 also preferably being a light press-fit.

Figure 17:
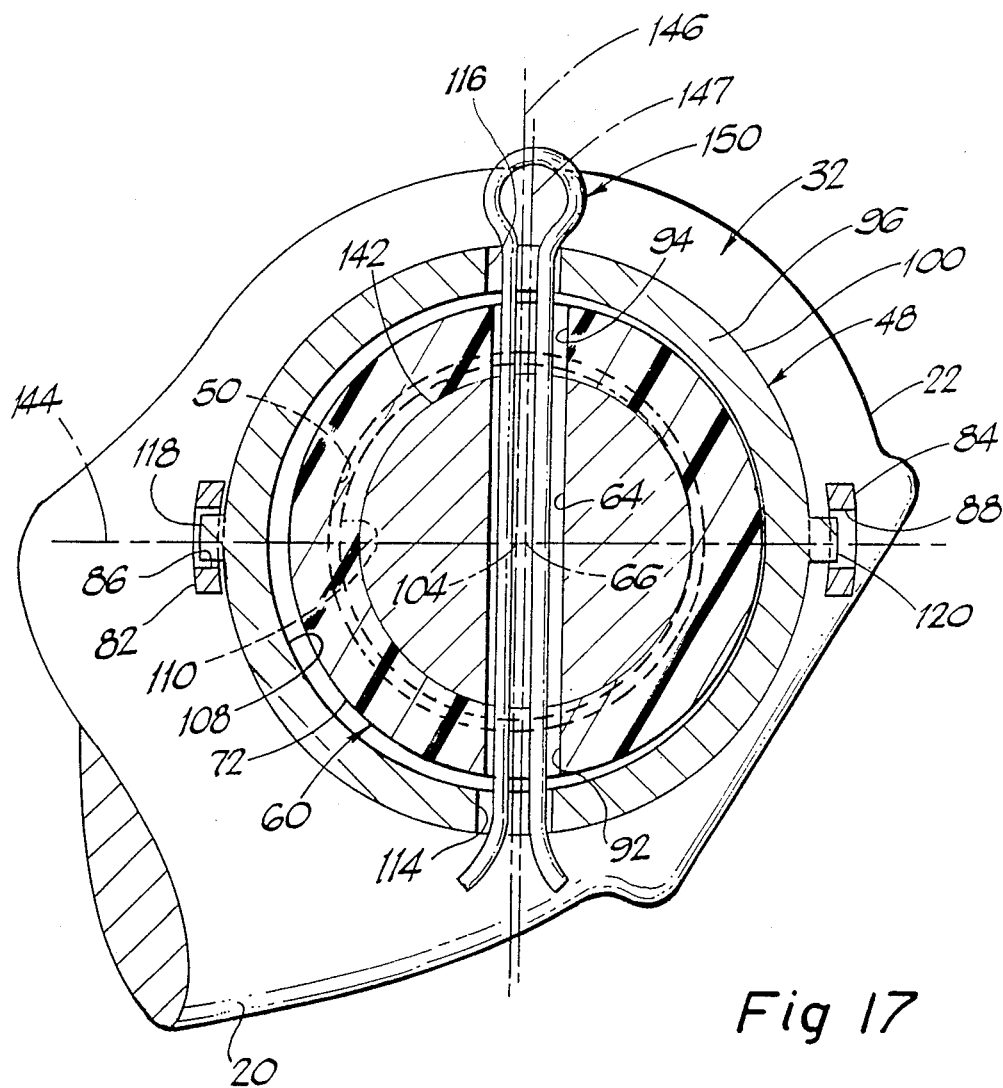
FIG. 17 is a cross-sectional view taken generally on the plane of line 17—17 of FIG. 3 and looking in the direction of the arrows.

In FIG. 17, the various elements shown therein are illustrated in a brake system null operating condition or position corresponding to that of FIG. 16. The direction of movement of the brake rod 20, during energization of the vehicular brake system would be generally to the left (as viewed in FIG. 17) as along, for example, axis 144. Once the various elements are assembled, as described with reference to FIG. 16, passageway 64 in pin shank 142 is in alignment with passages or apertures 92 and 94 of member 60 and, generally, in alignment with passages or apertures 114 and 116 of member 48. However, during the depicted unactivated state of brake application, the centers 104 and 66 are slightly spaced from each other thereby resulting in apertures 114 and 116 likewise being somewhat eccentrically situated with respect to passageway 64 and apertures 92 and 94. Preferably, suitable locking means such as, for example, a cotter pin or key 150 is inserted into such aligned apertures and passage to thereby prevent accidental disengagement as between and among members 48 and 60 and pin 52.

OPERATION OF INVENTION

As should now be apparent, when the vehicular brake lever 12 is in its inactive state the lever 12 will be in its solid-line position as depicted in FIG. 1 and the various elements comprising the sensor assembly 32 will be in positions as generally depicted in and described with reference to FIG. 16. Also, as should now be apparent, because of the differences in diametrical sizes of: (a) inner cylindrical passage 110 and cylindrical shank 142; (b) cylindrical surfaces 76 and 108; (c) cylindrical surface 72 and the radially inward surfaces of arms 82 and 84; and (d) cylindrical surfaces 72 and 78, the various elements are abe to experience relative movement transversely of axis 104 and/or 66. However, because of the somewhat resilient preload caused by the elastomeric means 22, member 60 and pin or journal 52 are, during a de-energized mode of the brake lever 12, effectively held in their right-most position as depicted in and described with reference to FIG. 16. It is only during application or energization of the vehicular braking system that the member 60 and pin 52 move transversely and toward the left, as viewed in FIG. 16, relatively away from the contact point 143 and toward a contact as between pin 142 and surface 110, at the diametrically opposite area.

More specifically, let it be assumed that the associated vehicle is in motion and that the driver desires to bring the vehicle to a stop. The sequence of events, generally, would be as follow.

The driver would step against the brake lever pad 18 causing the brake lever 12 to start to pivotally rotate as toward the depicted phantom line position. Such movement, of course, also initiates movement of the brake rod 20 toward the left (as viewed in FIG. 1) and as the brake rod 20 starts to so move, a resistance to further movement of rod 20 comes into existence. The resistance, generally, is the reactive force of the remaining portion of the vehicular braking system and, generally, the magnitude of such reactive force is related to the force being applied by the driver against the brake pedal pad 18.

Consequently, once braking force is being applied to the brake lever pad 18 causing clockwise rotation of the brake lever 12 while a reactive resistive force (in a generally opposite direction) is being applied by the brake rod 20 tending to prevent further clockwise rotation of brake lever 12. Referring to each of FIGS. 1, 3 and 16, it can be seen that as the brake lever 12 is further or more forcefully depressed (as in the direction of arrow B of FIG. 3) the reactive resistive force of brake rod 20 is actually experienced in a direction opposite to arrow A of FIG. 3. This then causes the previously discussed relative transverse movement whereby pin 52 and number 60 move (generally in the directions of arrows A and B of FIG. 3) close to having pin shank 142 becoming engaged against cylindrical surface 110 (as in the area above axis 66 of FIG. 3). Such relative transverse movement causes the force sensitive resistance means 132 to experience an increasing magnitude of force thereagainst resulting, in the embodiment disclosed, in the related decrease of resistance across terminals or contacts 134 and 136. When the resistance is thusly diminished to a preselected value, the resulting voltage across conductors 34 and 36 is sufficient to trigger suitable related logic type circuit means 38 which, in turn, enables the vehicular source of emf 40 to energize the vehicular stop lights or lamps 42, 44 and 46. When the driver subsequently releases the brake lever 12, the brake actuating force, is of course, eliminated thereby immediately eliminating the prior existing compressive force experienced by the force sensitive resistance means 132 and, simultaneously enabling the elastomeric means 122 to again position the components as generally depicted in FIGS. 16 and 17. Such elimination of the brake actuating force and the concomitant elimination of the preselected magnitude of compressive force experienced by the force sensitive resistance means 132 returns the force sensitive resistance means 132 to a relative high state of resistance and the resulting loss of voltage as across conductor means 34 and 36 becomes insufficient to cause the logic circuit means 38 to continue to maintain stop lamps 42, 44 and 46 energized thereby, of course, resulting in stop lamps 42, 44 and 46 becoming de-energized.

As should now be apparent, the invention provides a means and system for appropriately energizing, for example, vehicular stop lights without the necessity of employing any mechanical type electrical switch means, often subject to failure, and without the necessity of employing any hydraulic pressure responsive switch means which, too, are often subject to failure. Further, unlike the prior art, the invention does not employ any movable electrical contacts which are susceptible to corrosion and/or electrical pitting as well as mechanical failure. Also, for all practical purposes the invention provides an assembly which is, by design, inherently resistive to the intrusion of dirt and or moisture and the degree to which such may intrude into the overall assembly, the operation thereof is not significantly impaired.

Further, as previously mentioned, it is not unusual for a driver to rest the driver's foot against the brake pedal pad either directly thereon or at an angular position relative thereto. In prior art systems this was usually sufficient to cause energization of the vehicular stop lights. However, this does not occur with the invention since the force thusly applied by the driver's resting foot (on brake pedal pad 18), even if in a direction as depicted by arrow B of FIG. 3, would normally be insufficient to develop a force on the force sensing resistor 132 of a magnitude which would reduce the resistance across terminals 134 and 136 to the preselected magnitude resulting in energization of stop lights 42, 44 and 46. Further, if the driver's foot rests against the brake pedal pad 18 at an angle thereto, only the component of the force thereof directed in the direction of arrow B of FIG. 3 is effective toward creating a force against the force sensing resistor means 132 and such component is even less in magnitude and therefore insufficient to sufficiently load the force sensing resistor means 132 as to cause energization of the stop lights 42, 44 and 46.

SECOND EMBODIMENT OF THE INVENTION

Figure 18:
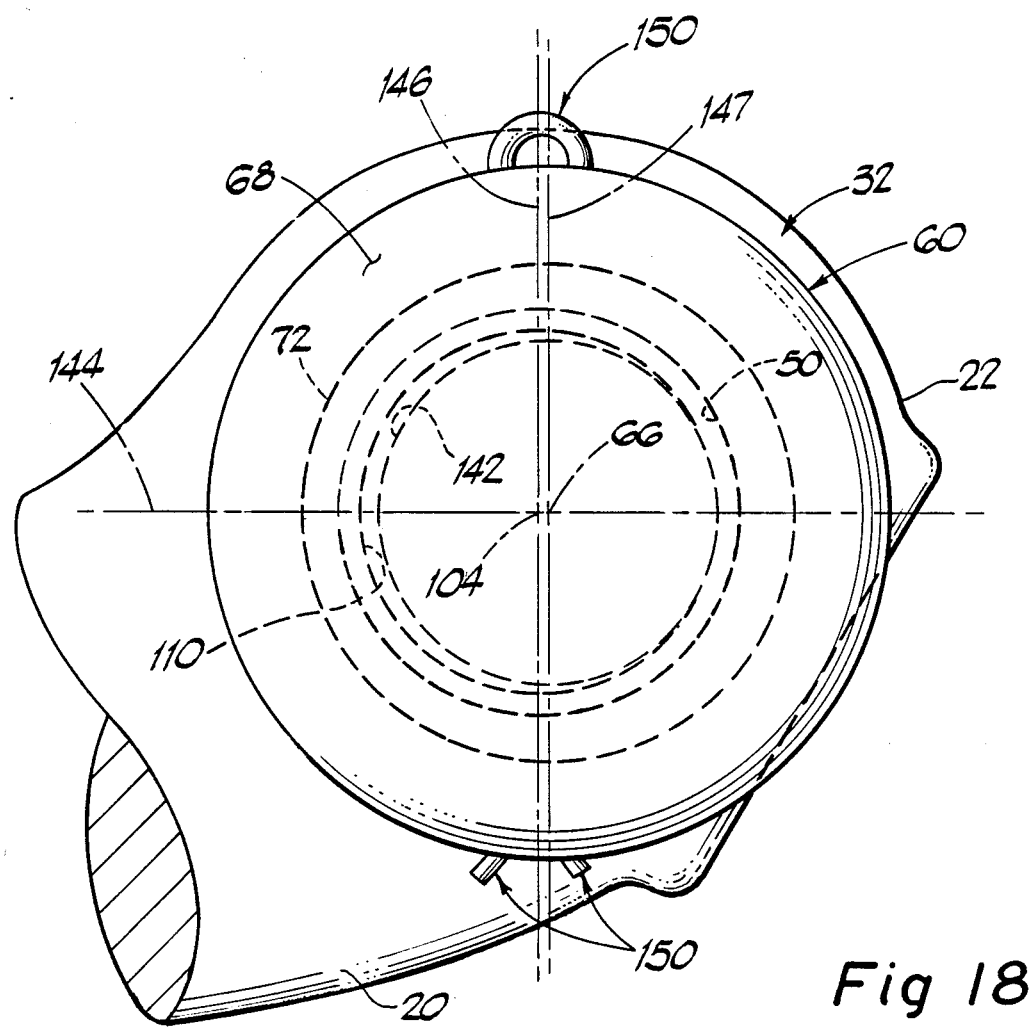
FIG. 18 is an axial end view taken generally on the plane of line 18—18 of FIG. 3 and looking in the direction of the arrows.
Figure 19:
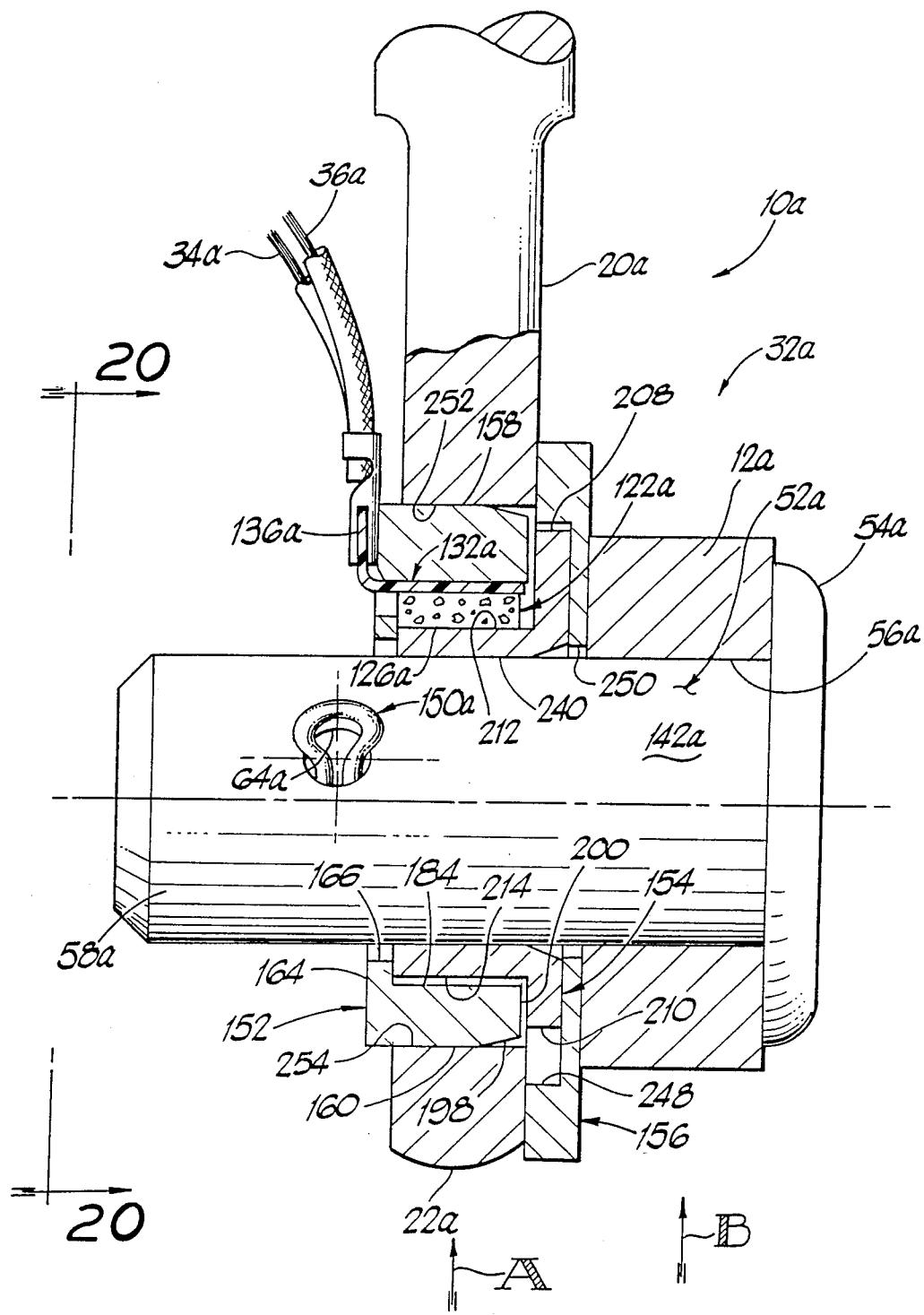
FIG. 19 is a view, similar to FIG. 3 and taken in a direction similar to that of FIG. 3 but illustrating another embodiment of the invention.
Figure 20:
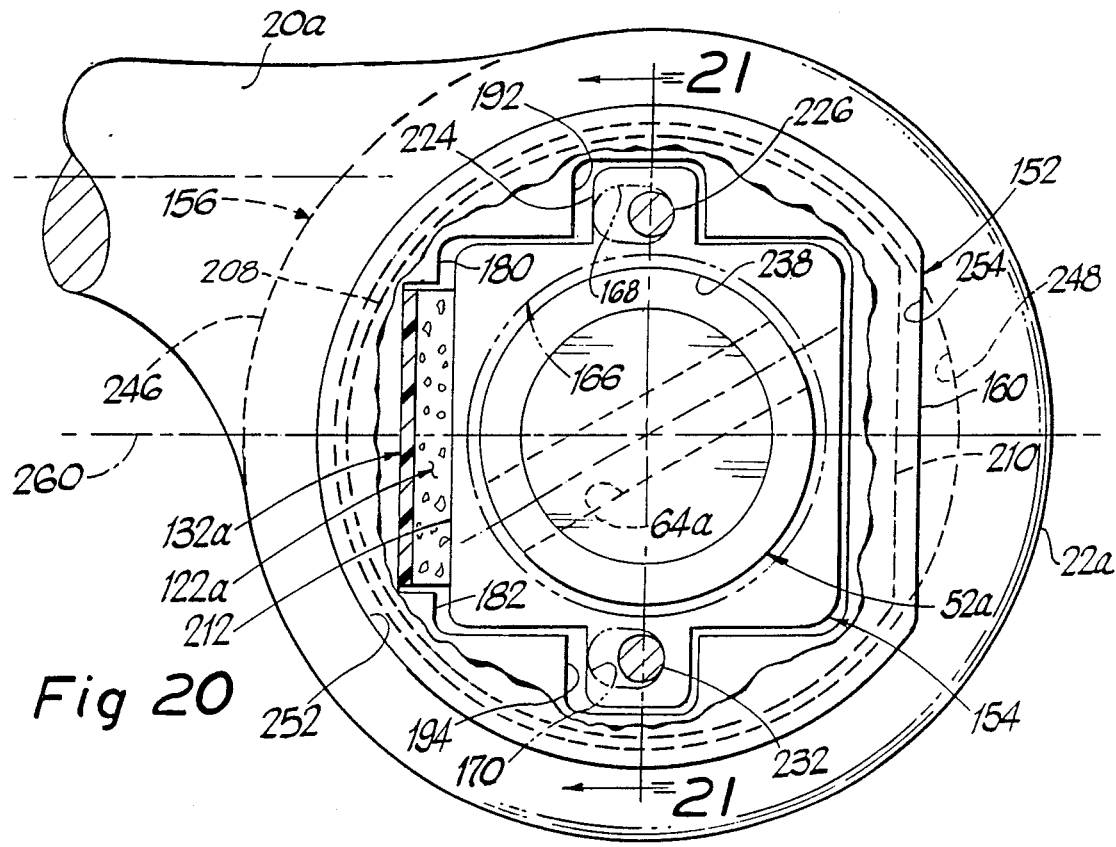
FIG. 20 is a view taken generally on the plane of line 20—20 of FIG. 19 and looking in the direction of the arrows, with certain portions broken away and in cross-section.
Figure 21:
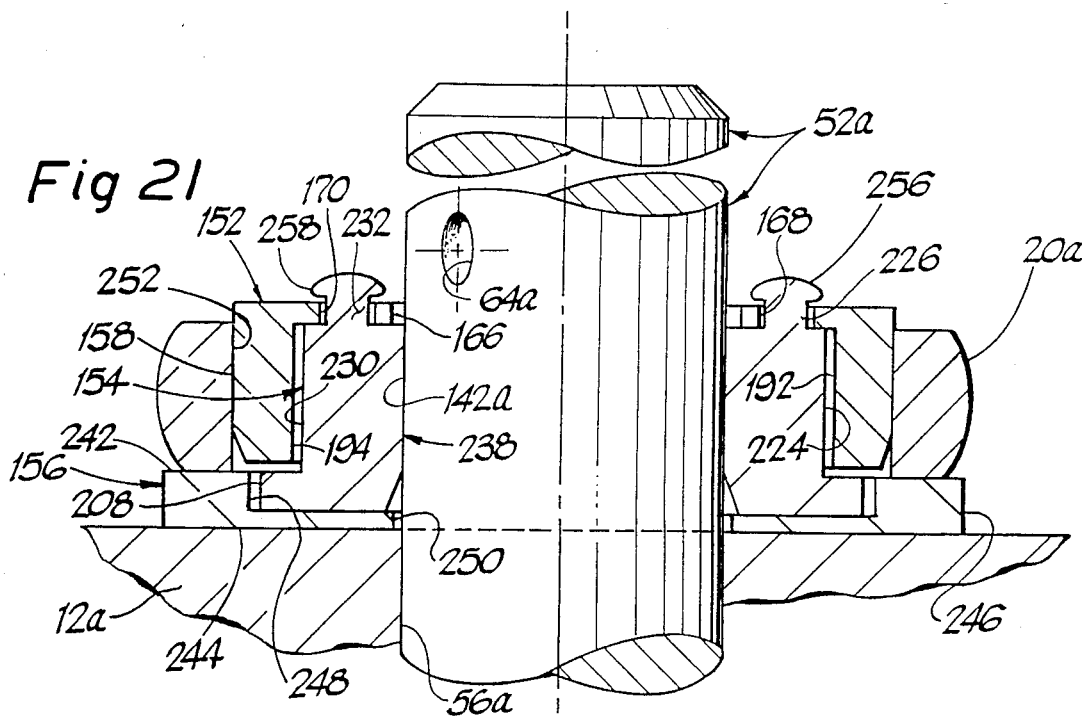
FIG. 21 is a view taken generally on the plane of line 21—21 of FIG. 20 and looking in the direction of the arrows.

FIGS. 19, 20 and 21 illustrate another embodiment of the invention. In FIGS. 19, 20 and 21, for ease of disclosure, it may be assumed that: (a) FIG. 19 is a view taken as if on a plane 3—3 of FIG. 1; (b) the assembly 10a is functionally equivalent to assembly 10 of FIG. 1; (c) brake lever or arm 12a is like or functionally equivalent to brake lever or arm 12 of FIG. 1; (d) brake lever pin 52a is like or functionally equivalent to brake lever pin 52 of FIGS. 3 and 16; (e) keying or locking means 150a is like or functionally equivalent to pin 150 of FIGS. 17 and 18; and (f) electrical leads or conductors 34a and 36a are like or functionally equivalent to conductor means 34 and 36 FIG. 1 and serve to electrically connect the assembly 10a to the control means 38, source of emf 40 and stop lights or lamp assemblies 42, 44 and 46 of FIG. 1. Additionally, other elements in FIGS. 19–32 which are like or similar to those of FIGS. 1–18 may be identified with like reference numbers provided with a suffix "a".

Referring now in greater detail to FIGS. 19, 20 and 21, the signal mechanism or means 32a is illustrated as comprising a housing-like member 152, generally operatively connected to and carried by the brake rod means 20a, a force sensitive resistance carrier or bearing means 154 and, if desired, spacer means 156. As previously discussed with reference to FIG. 3, the directions of motion of the brake rod or linkage means 20a and the brake lever 12a, during energization of the vehicular braking system, are respectively depicted by arrows A and B in FIG. 19 which, generally, corresponds to a leftward movement as viewed in FIG. 20.

Referring in greater detail to FIGS. 22–26, the housing or cover means 152 is depicted as comprising a generally disk-like body 157 having a cylindrical outer surface 158 which, in the preferred embodiment, does not extend uninterrupted but instead changes into a flat or straight outer surface 160 with such outer surfaces being substantially parallel to the central axis 162 of member 152.

Body 157 has an integrally formed generally transverse axial end wall 164 which, in turn, has a centrally situated passage or aperture 166 formed therethrough and a plurality of relatively smaller somewhat elongated holes or slots 168 and 170 formed therethrough.

A cavity or recess is formed within body 157 and is depicted as being defined, generally, by first coplanar wall surfaces 172 and 174 and opposed second coplanar wall surfaces 176 and 178. Such first and second coplanar wall surfaces are preferably parallel to each other as well as to axis 162. Third coplanar wall surfaces 180 and 182 are substantially parallel to axis 162 and to an opposed wall surface 184. A further wall surface 186, generally intermediate walls 180 and 182 is also substantially parallel to wall surface 184 and axis 162. The intermediate wall surface 186 may be connected to wall surfaces 180 and 182 as by transitional wall surfaces 188 and 190. Somewhat similarly, relatively enlarged areas of the cavity or recess are formed or defined as by U-shaped wall surfaces 192 and 194 (as viewed in either FIGS. 22 or 24) respectively situated generally intermediately of wall surfaces 172, 174 and intermediately of wall surfaces 176 and 178. All of such wall surfaces, described as defining the cavity or recess, preferably extend inwardly as to terminate in a generally transverse inner axial end wall surface 196. In the preferred embodiment, the outer surface of body 157 is formed with a slight continuous taper-like surface 198, generally, as at axial end 200. Although member 152 may be formed of any suitable material, in the preferred embodiment such would be formed of the same or equivalent material previously described as being preferred for the formation of members 48 and 60 of FIGS. 4–11.

Referring in greater detail to FIGS. 27–30, the bearing or carrier member 154 is illustrated as comprising a generally square-like body 202 (as viewed in FIG. 27) having an axis 204 and a generally transversely or radially extending axial end wall 206. As best seen in FIG. 27, the wall 206 has, for the major portion thereof, an outer cylindrical surface 208 which terminates in a flat outer surface portion 210 which is preferably parallel to axis 204 and to opposite side wall surfaces 212 and 214 of body 202.

In the preferred embodiment, the opposite axial surfaces 216 and 218 of end wall or flange 206 are parallel to each other and normal to axis 204.

The opposite wall surfaces 220 and 222 of body 202 are preferably parallel to each other and to axis 204 as well as generally square to surfaces 212 and 214. Wall 220 has an integrally formed generally rectangular (as viewed in FIG. 27) arm-like body extension 224 which, in turn, carries a pin-like extension 226 having an axis 228 parallel to axis 204. Similarly, wall 222 has an integrally formed generally rectangular (as viewed in FIG. 27) arm-like body extension 230 which, in turn, carries a pin-like extension 232 having an axis 234 parallel to axis 204. As shown in FIGS. 28 and 29, both pin members or portions 226 and 232 extend a substantial distance beyond the axial end surface 236 of body 202. A passage 238 having a cylindrical surface 240 is formed through body 202 (including the area of the end wall or flange 206) as to have its axis coincident and in alignment with axis 204.

The bearing or carrier means 154 may be formed of any suitable material; however, in the preferred embodiment the carrier means 154 would be formed of nylon, grade 66, which is, generally, a condensation product of adipic acid and hexamethylenediamine, or, "Zytel", grade 101, which is a trademark of the DuPont de Nemours, E.I. & Co., of Wilmington, Del., for a nylon resin available as a molding powder.

The spacer member 156, if such is employed, may be a disk-like member having generally parallel axial end surfaces 242 and 244 with an outer cylindrical surface 246 and generally concentrically formed counterbore 248 and clearance passage or aperture 250 formed therethrough.

The brake rod means 20a is formed with an aperture therein or therethrough and such aperture is defined by outer surfaces which closely approach the configuration of the outer surfaces of member or housing 152. For example, referring to FIGS. 19, 20, 21 and 22, it can be seen that the aperture in brake actuating rod or means 20a comprised, in the most part, of a cylindrical inner surface 252, closely conforming to outer surface 158 of member 152, and a flat surface 254, closely conforming to the flat outer surface 160 of member 152.

As depicted by FIGS. 19, 20 and 21, the pin 52a is preferably closely received by and through passage 56a of brake lever 20a while the spacer 156 is placed against brake lever 20a as to have its passage 250 loosely spaced about cylindrical surface 142a of the shank of pin 52a.

As is illustrated in FIGS. 19 and 20, the force sensitive resistance means or cell 132a is situated, by means of suitable adhesive backing and with cell leads 134a and 136a protruding through an access provided in member 152 (as best illustrated in FIG. 19), onto surface 186 of member 152. The elastomeric member 122a is then situated, by means of suitable adhesive backing, onto exposed surface of cell member 132a, creating a sandwiched construction as best depicted in FIG. 19.

Thus situated, the assembled member 152 is then positioned onto bearing member 154, with surface 212 of member 154 contacting or being in juxtaposition with elastomeric member 122a. The pin portions 226 and 232 of bearing 154 are respectively received through elongated holes or slots 168 and 170 (shown in phantom line in FIG. 20) of housing member 152 whereby the pins 226 and 232 become generally contained by slots 168 and 170 of cover member 152. In the preferred embodiment, the otherwise projecting ends of pins 226 and 232 are, as by heat or cold forming, formed or staked over to provide head portions 256 and 258 which are, in transverse dimension, larger than the width of slots 168 and 170.

The entire assembly 32a is then pushed onto surface 142a of pin 52a and, preferably, the diametrical dimensions of the cylindrical surfaces 142a and 240 are such as to result in a press fit therebetween. The flange portion 206 of carrier or bearing member 154 is received as in the counterbore 248 of spacer 156. During this time, the brake actuating rod or linkage means 20a may be situated against the face 242 of spacer 156. The housing member 152 of assembly 32a is situated such that flattened surface 160 is in engagement with surface 254 of push rod 20a and the cylindrical surfaces 252 and 158 are in engagement with each other. The juxtaposed surfaces 160 and 254 as well as surfaces 252 and 158 may be press-fit to each other.

In so assembling the sensor assembly 32a, passage 166 of housing member 152 becomes spaced from the juxtaposed portion of pin 52a cylindrical surface 142a as shown in FIGS. 19 and 21 and as depicted in phantom line in FIG. 20.

The distance between walls 220 and 222 of bearing means 154 is slightly less than the distance as between walls 176, 178, at one side, and walls 172, 174, at the opposite side of housing or cover means 152 thereby permitting sliding motion of the bearing or carrier 154, relative to cover 152, generally in the direction of horizontal axis 260 (of FIG. 20) which may be considered as being in alignment with arrow A of FIG. 19.

As possibly best shown in FIG. 20, wherein the various elements may be considered as occupying respective positions corresponding to a condition wherein the vehicle operator is not applying a braking force, considerable space, generally in the direction of axis 260, exists as between: (a) surface 192, of housing 152, and the juxtaposed surface of arm-like extension 224 of bearing 154; (b) surface 194, of housing 152, and the juxtaposed surface of arm-like extension 230 of bearing 154; (c) surface 212 of bearing 154 and juxtaposed surfaces 180 and 182 of housing or cover 152.

Consequently, when the vehicular driver applies a braking force to brake lever means 12a (as by the pedal not shown but equivalent to 18 of FIG. 1) the brake lever means 12a is moved (as in a manner generally depicted in FIG. 1) toward and against the brake rod or linkage means 20a. More particularly the brake lever 12a, and pin 52a moving with it, progressively move relative to the cover member 152 and brake rod means 20a with such relative movement being generally leftward as viewed in FIG. 20. Since the bearing or carrier 154 is attached to and carried by pin 52a, the bearing 154 undergoes the same relative movement progressively approaching surfaces 180 and 182 (of housing 152) and in so doing applies a force against the elastomeric means 122a which, in turn, transfers the force to and against the force sensitive resistance or cell means 132a.

As in the embodiment of FIGS. 1–18, when a preselected magnitude of force is thusly experienced by the force sensitive resistance means 132a, the magnitude of the electrical resistance thereof is sufficiently changed as to result in an electrical signal therethrough to be transmitted as via conductor means 34a and 36a to the related logic or control means 38 (FIG. 1) so as to, in turn, result in the stop lights or lamp assemblies 42, 44 and 46 to be energized as by vehicular emf means 40.

In the embodiment of FIGS. 19–32 a keying or locking means 150a is provided as into passage 64a to assure the continued assembly of the overall means 32a. Also, as now should be apparent, the cooperating flatted surfaces 160 and 254 serve as keying means effective for preventing undesired relative rotation therebetween and assure the continued relative positions of the elements shown in FIG. 20 with respect to brake rod or linkage means 20a.

It should be mentioned that the invention herein disclosed has been disclosed as being situated at the pivotal point as between the brake lever (12 or 12a) and the brake rod (20 or 20a). However, since the invention employs reactive forces generated during application of the vehicular braking system, the invention may be practiced equally well by being, instead, operationally situated as at where the brake lever (12 or 12a) is pivotally mounted to the pivot support means 16—16 (FIGS. 1 and 2) and having a simple pivotal connection as between the brake lever (12 or 12a) and the brake rod or linkage (20 or 20a). In that way the reactive forces would still be generated by application of the brake pedal (12 or 12a) but applied to the force sensitive resistance means (132 or 132a) located within assemblies 32 or 32a in operative combination with pivot 14 and pivot supports 16—16.

In each of the embodiments disclosed, even though relative motion is being experienced (during vehicular brake application) as between the brake pedal (12 or 12a) and brake linkage (20 or 20a) such relative motion is very small and secondly is continually undergoing a resistive reactive force thereby resulting in the driver not even being, in a sensory manner, aware of such relative motion occurring.

Although only a preferred embodiment and a selected second embodiment of the invention have been disclosed and described, it is apparent that other embodiments and modifications of the invention are possible within the scope of the appended claims.

What is claimed is:

1. An arrangement effective for creating an output signal, comprising a first movable element, a second movable element, said first movable element being effective for moving said second movable element, signal generating means for indicating when a preselected magnitude of a first force is applied to said first movable element when said first movable element is in the process of at least tending to move said second movable element, said signal generating means comprising force sensitive electrical resistance means, wherein said force sensitive electrical resistance means varies its electrical resistance in response to the magnitude of a force applied thereto, wherein said force sensitive electrical resistance means is situated as to experience thereagainst a reaction-force developed in response to said first force being applied to said first movable element, said force sensitive electrical resistance means being effective upon said reaction-force attaining a preselected magnitude to produce a magnitude of electrical resistance serving as an output signal indicative of the attainment of said preselected magnitude by said first force applied to said first movable element, wherein said first movable element is pivotally connected to said second movable element by interconnecting pivot means, and wherein said interconnecting pivot means comprises said force sensitive electrical resistance means.

2. An arrangement effective for creating an output signal, comprising a first movable element, a second movable element, said first movable element being effective for moving said second movable element, signal generating means for indicating when a preselected magnitude of a first force is applied to said first movable element when said first movable element is in the process of at least tending to move said second movable element, said signal generating means comprising force sensitive electrical resistance means, wherein said force sensitive electrical resistance means varies its electrical resistance in response to the magnitude of a force applied thereto, wherein said force sensitive electrical resistance means is situated as to experience thereagainst a reaction-force developed in response to said first force being applied to said first movable element, said force sensitive electrical resistance means being effective upon said reaction-force attaining a preselected magnitude to produce a magnitude of electrical resistance serving as an output signal indicative of the attainment of said preselected magnitude by said first force applied to said first movable element, and further comprising first and second pivot means, wherein said first movable element is operatively connected to both said first and second pivot means, and wherein at least one of said pivot means comprises said force sensitive resistance means.

3. An arrangement effective for creating an output signal, comprising a first movable element, a second movable element, said first movable element being effective for moving said second movable element, signal generating means for indicating when a preselected magnitude of a first force is applied to said first movable element when said first movable element is in the process of at least tending to move said second movable element, said signal generating means comprising force sensitive electrical resistance means, wherein said force sensitive electrical resistance means varies its electrical resistance in response to the magnitude of a force applied thereto, wherein said force sensitive electrical resistance means is situated as to experience thereagainst a reaction-force developed in response to said first force being applied to said first movable element, said force sensitive electrical resistance means being effective upon said reaction-force attaining a preselected magnitude to produce a magnitude of electrical resistance serving as an output signal indicative of the attainment of said preselected magnitude by said first force applied to said first movable element, wherein said first movable element comprises a manually actuatable vehicular brake lever, wherein said second movable element comprises a vehicular brake system actuating linkage, wherein said brake lever is pivotally mounted at least near a first of its ends to associated vehicular support structure as to have a second of its ends opposite to said first end generally freely swingable, wherein said actuating linkage is operatively connected to said brake lever by pivot means situated generally between said first and second ends of said brake lever, and wherein said pivot means comprises said force sensitive resistance means.

4. An arrangement according to claim 3 and further comprising vehicular stop lamp means, and circuit means electrically interconnecting said stop lamp means and said force sensitive electrical resistance means, and wherein said circuit means is effective to cause energization of said stop lamp means when said force sensitive resistance means produces said output signal.

5. An arrangement according to claim 3 wherein said pivot means comprises a first pivot means element movable in unison with said brake lever, wherein said pivot means comprises a second pivot means element movable in unison with said actuating linkage, wherein at least portions of said first pivot means element and said second pivot means element are in juxtaposition with each other and spaced from each other, and wherein said force sensitive resistance means is situated between said spaced juxtaposed portions so that movement of said actuating linkage by said brake lever occurs through said force sensitive resistance means.

6. An arrangement according to claim 5 and further comprising vehicular stop lamp means, and circuit means electrically interconnecting said stop lamp means and said force sensitive electrical resistance means, and wherein said circuit means is effective to cause energization of said stop lamp means when said force sensitive resistance means produces said output signal.

7. In a vehicle braking system having a master cylinder means, a force responsive signal generating arrangement, comprising brake pedal means pivotally mounted in said vehicle for manually initiating the braking system, push rod means for translating the arcuate motion of said brake pedal means into linear motion for actuation of said master cylinder means, a passage formed through said push rod means, a first generally tubular member at least partly received in said first passage and carried by said push rod means for movement in unison therewith, said first generally tubular member comprising first and second generally cylindrical inner surface portions, a second generally cylindrical member, said second member comprising a first generally cylindrical inner surface portion and a third generally cylindrical inner surface portion, a pivot-like drive pin member carried by said brake pedal means for movement in unison therewith, wherein said drive pin member comprises a second generally cylindrical outer surface portion, wherein said drive pin member extends through said first cylindrical inner surface portion as to have an extending portion thereof extend axially therebeyond and into the general region of said second cylindrical inner surface portion, wherein said second member is connected to and carried by said extending portion of said drive pin member, wherein the diametrical dimension of said third cylindrical inner surface portion is such as to have said third cylindrical inner surface portion at least closely received by said extending portion of said drive pin member, wherein the diametrical dimension of said first cylindrical inner surface is a selected larger dimension than the diametrical dimension of said second cylindrical outer surface portion thereby permitting said drive pin member and said second member to in unison move relatively with respect to and transversely of said first cylindrical inner surface portion, force sensitive electrical resistance means, elastomeric means, wherein said force sensitive electrical resistance means and said elastomeric means are layered with respect to each other and collectively contained between said first cylindrical outer surface portion and said second cylindrical inner surface portion, said contained elastomeric means and said force sensitive electrical resistance means being situated generally at one side of the axes of said first and second cylindrical outer surface portions and said first and second cylindrical inner surface portions, wherein said contained elastomeric means and said force sensitive electrical resistance means are effective to urge said second member and said drive pin member to assume a position whereby that part of said second cylindrical outer surface portion which is situated generally at a side of said axes opposite to said one side engages that part of said first cylindrical inner surface portion which is also situated generally at said side of said axes opposite to said one side, wherein said force sensitive electrical resistance means is adapted for operative connection to a source of electrical potential and to associated operational electrical circuit means, wherein when said brake pedal means is manually actuated said drive pin member is caused to undergo actuation movement away from said part of said first cylindrical inner surface portion which is also situated at said side of said axes opposite to said one side and toward engagement with that part of said first cylindrical inner surface portion situated generally at said one side of said axes, and wherein while said drive pin member is undergoing said actuation movement said layered force sensitive electrical resistance means and said elastomeric means are caused to be increasingly compressed between said first cylindrical outer surface portion and said second cylindrical inner surface portion to thereby transmit the force applied to said brake pedal means by manual actuation thereof to said second member and said push rod means and to thereby vary the magnitude of the electrical resistance of said force sensitive electrical resistance means.

8. A force responsive signal generating arrangement according to claim 7 wherein the diametrical dimension of said first cylindrical outer surface portion is larger than the diametrical dimension of said first cylindrical inner surface portion.

9. A force responsive signal generating arrangement according to claim 7 wherein the diametrical dimension of said second cylindrical inner surface portion is larger than the diametrical dimension of said second cylindrical outer surface portion.

10. A force responsive signal generating arrangement according to claim 7 wherein said first generally tubular member comprises a first tubular portion of generally cylindrical outer configuration and a second tubular portion of generally cylindrical outer configuration which is substantially larger in diametrical dimension than said first tubular portion, and wherein said first tubular portion is press-fit into said passage formed through said push rod means.

11. A force responsive signal generating arrangement according to claim 7 wherein said first generally tubular member and said second generally cylindrical member each comprise latching means, and wherein said latching means is effective for latchingly connecting said first generally tubular member and said second generally cylindrical member to each other.

12. A force responsive signal generating arrangement according to claim 7 wherein said first generally tubular member comprises a first tubular portion of generally cylindrical outer configuration and a second tubular portion of generally cylindrical outer configuration which is substantially larger in diametrical dimension than said first tubular portion, wherein said first tubular portion is received by said passage formed through said push rod means in a manner whereby rotation of said first tubular portion relative to said push rod means is precluded, and further comprising detent-like latching means for mechanically latching said first generally tubular member and said second generally cylindrical member to each other, wherein said detent-like latching means comprises first latching means carried by said first generally tubular member and second latching means carried by said second generally cylindrical member, wherein said first and second latching means are operatively connectable to each other, and wherein at least one of said first and second latching means is resiliently deflectable.

13. A force responsive signal generating arrangement according to claim 12 wherein said second latching means is resiliently deflectable.

14. A force responsive signal generating arrangement according to claim 12 wherein said first detent means comprises a plurality of abutment-like portions carried by said second tubular portion, and wherein said second detent means comprises a plurality of arm-like portions carried by said second generally cylindrical member and effective for latchingly engaging said abutment-like portions.

15. A force responsive signal generating arrangement according to claim 14 wherein said second generally cylindrical member comprises a generally transversely extending wall portion, wherein said wall portion extends outwardly generally radially of said axes as to extend beyond the cylindrical outer configuration of said second tubular portion, and wherein said arm-like portions are carried by said wall portion.

16. A force responsive signal generating arrangement according to claim 15 wherein said arm-like portions comprise cut-out portions formed therein, and wherein abutment-like portions are latchingly at least partly received by said cut-out portions.

17. A force responsive signal generating arrangement according to claim 15 and further comprising locking means opertively lockingly interconnecting said drive pin member to said first generally tubular member and to said second generally cylindrical member.

18. A force responsive signal generating arrangement according to claim 7 and further comprising locking means operatively lockingly interconnecting said drive pin member to said first generally tubular member and to said second generally cylindrical member.

19. A force responsive signal generating arrangement according to claim 18 wherein said locking means comprises key-like means.

20. A force responsive signal generating arrangement according to claim 7 and further comprising a second passage formed through said brake pedal means, and wherein said drive pin member extends through said second passage.

21. In a vehicle braking system having a master cylinder means, a force responsive signal generating arrangement, comprising pedal means pivotally mounted in said vehicle for manually initiating the braking system, a force transmitting pin-like member carried by said pedal means for movement in unison therewith, push rod means for translating the arcuate motion of said pedal means into linear motion for actuation of said master cylinder means, force transmitting means carried by said push rod means for movement in unison therewith, wherein said force transmitting pin-like member is at least partly received in said force transmitting means, wherein a space exists as between juxtaposed surfaces of said force transmitting pin-like member and said force transmitting means, force sensitive electrical resistance means and elastomeric means collectively urging said juxtaposed surfaces toward abutting engagement with each other during such times as when said pedal means is not being manually actuated, wherein said force sensitive electrical resistance means is adapted for operative connection to a source of electrical potential and to associated operational electrical circuit means, wherein when said pedal means is manually actuated all of the force manually applied to said pedal means is transmitted from said force transmitting pin-like member through said elastomeric means and through said force sensitive electrical resistance means to said force transmitting means and to said push rod means for actuation of said master cylinder means, and wherein when said force sensitive electrical resistance means experiences a preselected magnitude of force applied thereagainst the electrically resistive value thereof attains a preselected magnitude of electrical resistance thereby causing a related electrical signal to be available for application to said associated operational electrical circuit means.

22. A force responsive signal generating arrangement according to claim 21 wherein said force transmitting means comprises an abutment-like member separate from said push rod means and fixedly secured thereto.

23. A force responsive signal generating arrangement according to claim 21 wherein said force transmitting means comprises an arcuate surface portion, and wherein when said pedal means is manually actuated and all of the force manually applied to said pedal means is transmitted through said force sensitive electrical resistance means to said force transmitting means said force sensitive electrical resistance means and said elastomeric means are jointly urged against said arcuate surface portion.

24. A force responsive signal generating arrangement according to claim 21 wherein said force transmitting means comprises a first body separate from said push rod means and fixedly carried by said push rod means for movement in unison therewith, a recess-like chamber formed in said first body, and further comprising a second body situated generally in said recess-like chamber, first guide surface means carried by said first body, second guide surface means carried by said second body, wherein said first body and said second body are slidably movable with respect to each other, wherein said first and second guide surface means serve to guide said first and second bodies as said first body and said second body slidably move with respect to each other, wherein said pin-like member extends into said second body, wherein when said pedal means is manually actuated said pin-like member and said second body move in unison with respect to said first body in a first direction during which said first and second guide surface means serve to guide said second body as said second body slides with respect to said first body, wherein said space exists immediately between a first face of said first body and a juxtaposed second face of aid second body, wherein said force sensitive electrical resistance means is situated in said space between said first face and said second face, and wherein when said second body is being moved in said first direction said second face is moved toward said first face as to thereby apply to and through said force sensitive electrical resistance means the force manually applied to said pedal means.

25. A force responsive signal generating arrangement according to claim 24 wherein one of said first and second bodies is provided with slot means elongated in a direction of said first direction, wherein the other of said first and second bodies is provided with pin means extending generally contained by said slot means, and wherein when said first body and said second body move relative to each other in said first direction or in a direction opposite thereto said pin means and said slot means move relative to each other in the direction of the elongation of said slot means.

26. A force responsive signal generating arrangement according to claim 25 wherein said slot means is formed in said first body, and wherein said pin means is carried by said second body.

27. A force responsive signal generating arrangement according to claim 25 wherein said pin means is provided with an abutment portion at an axial location thereof as to prevent withdrawal of said pin means from said slot means.

28. A force responsive signal generating arrangement according to claim 25 wherein said slot means comprises a first plurality of parallel slots, wherein said pin means comprises a second plurality of pin portions, wherein the number of said first plurality of parallel slots equals the number of said second plurality of pin portions, wherein said first plurality of parallel slots are formed in said first body, and wherein said second plurality of pin portions are carried by said second body.

29. A force responsive signal generating arrangement according to claim 24 wherein said elastomeric means is situated in said space as to be in operative engagement with said force sensitive electrical resistance means.

30. A force responsive signal generating arrangement according to claim 24 wherein said first face of said second face are each of planar configuration and generally parallel to each other.

31. A force responsive signal generating arrangement according to claim 30 wherein the planar configuration of said first face and the planar configuration of said second face are each generally normal to said first direction.

32. A force responsive signal generating arrangement according to claim 24 wherein said first body comprises a first keying portion, wherein said push rod means carries a second keying portion, and wherein said first and second keying portions cooperate with each other to preclude relative rotation between said first body and said push rod means.

33. A pivotal connector for pivotally connector first and second members to each other and for creating an output signal indicative of an external force being applied to one of said first and second members and reacted against by the other of said first and second members, comprising a pivot-like means having a longitudinal axis and operatively joining said first and second members, force transmitting surface means carried by one of said first and second members, wherein said force transmitting surface means is situated generally to one side of said longitudinal axis, reaction force surface means carried by the other of said first and second members, means effective during periods of time when no external force is being applied to said one of said first and second members for translationally moving said pivot-like means in a first direction generally diametrically opposite to said one side of said longitudinal axis, force sensitive electrical resistance means situated between and operatively contained by said force transmitting surface means and said reaction force surface means, said force sensitive resistance means being adapted for operative connection to a source of electrical potential and to associated operational electrical circuit means, wherein when an external force is being applied to said one of said first and second members said pivot-like means is translationally moved in a second direction generally opposite to said first direction, wherein when said pivot-like means translationally moves in said second direction said force transmitting surface means and said reaction force surface means are caused to be brought closer to each other, wherein as said force transmitting surface means and said reaction force surface means are brought closer to each other said force sensitive electrical resistance means operatively contained therebetween experiences a comparative force related to the magnitude of said external force being applied to said one of said first and second members, and wherein as said force sensitive electrical resistance means experiences said compressive force the electrically resistive value thereof varies thereby causing a related electrical signal to be available for application to said associated operational electrical circuit means.

34. A pivotal connector according to claim 33 wherein said one of said first and second members comprises first and second functional ends, and wherein said pivot-like means is situated between said first and second functional ends.

* * * * *

UNITED STATES PATENT AND TRADEMARK OFFICE
CERTIFICATE OF CORRECTION

PATENT NO. : 4,978,177
DATED : December 18, 1990
INVENTOR(S) : Ronald D. Ingraham et al It is certified that error appears in the above-identified patent and that said Letters Patent is hereby corrected as shown below:

Column 1, lines 7 and 8, change "electricalswitch-ing" to --- electrical switching ---.

Column 7, line 52, change "abe" to --- able ---.

Column 7, line 55, change "22" to --- 122 ---.

Claim 7, line 15 thereof (Column 15, line 7), change "inner" to --- outer ---.

Claim 24, line 23 thereof (Column 18, line 26), change "aid" to --- said ---.

UNITED STATES PATENT AND TRADEMARK OFFICE
CERTIFICATE OF CORRECTION

PATENT NO. : 4,978,177

DATED : December 18, 1990

INVENTOR(S) : Ronald D. Ingraham et al

It is certified that error appears in the above-identified patent and that said Letters Patent is hereby corrected as shown below:

Claim 30, line 2 thereof (Column 18, line 68), change "of" to --- and ---.

Claim 33, line 1 thereof (Column 19, line 15). change "connector" (second occur.) to ---connecting---.

Claim 33, lines 35 and 36 (Column 20, lines 18 & 19), change "compara-tive" to --- compressive ---.

Signed and Sealed this

Twenty-third Day of June, 1992

Attest:

DOUGLAS B. COMER

*Attesting Officer*     *Acting Commissioner of Patents and Trademarks*